J. J. CONWAY AND E. KOEHLER.
COUPON SCISSORS.
APPLICATION FILED MAR. 14, 1921.
1,436,755.
Patented Nov. 28, 1922.
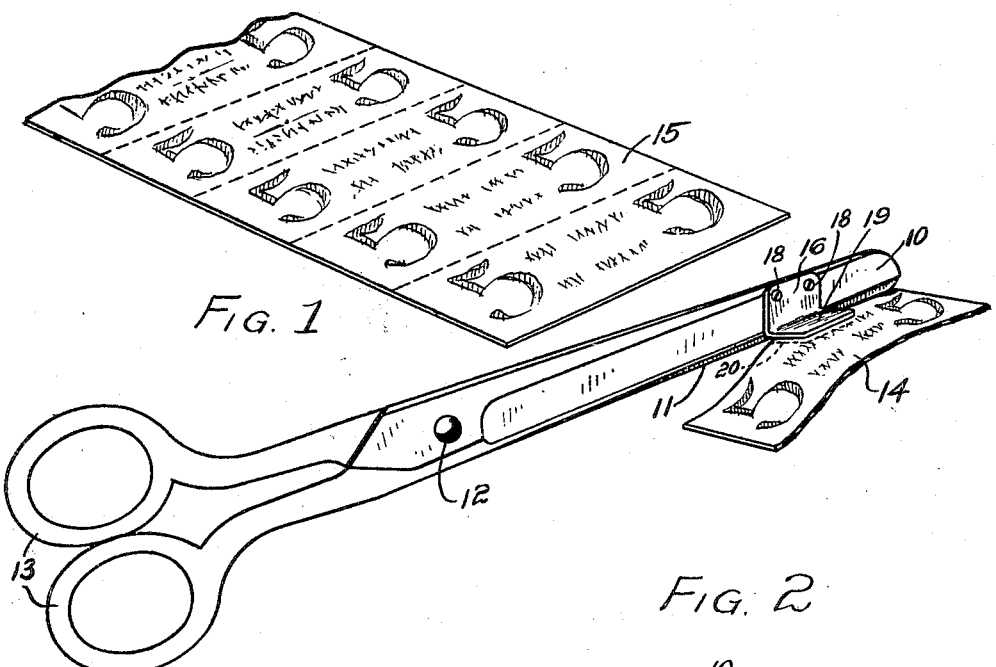
Fig. 1
Fig. 2
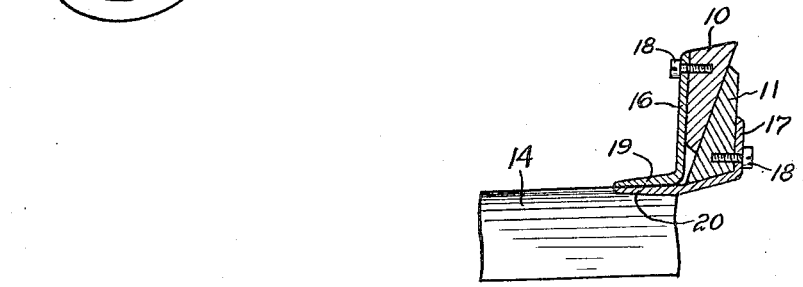
Fig. 3
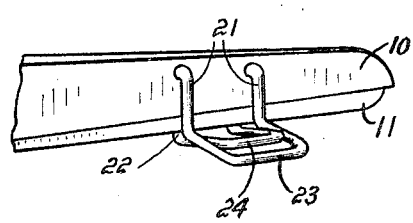
INVENTORS
John J. Conway and
Edward Koehler
BY
A. M. Wooster
ATTORNEY Patented Nov. 28, 1922.

1,436,755

UNITED STATES PATENT OFFICE.

JOHN J. CONWAY AND EDWARD KOEHLER, OF BRIDGEPORT, CONNECTICUT, ASSIGNORS TO THE ACME SHEAR COMPANY, OF BRIDGEPORT, CONNECTICUT, A CORPORATION OF CONNECTICUT.

COUPON SCISSORS.

Application filed March 14, 1921. Serial No. 452,113.

*To all whom it may concern:*

Be it known that we, JOHN J. CONWAY and EDWARD KOEHLER, citizens of the United States, residing at Bridgeport, county of Fairfield, State of Connecticut, have invented an Improvement in Coupon Scissors, of which the following is a specification.

This invention relates to scissors or shears for cutting portions from a sheet of paper or other material, and especially, although not exclusively, for clipping coupons from bonds or the like.

The invention has for its object to provide a clipping device of the character referred to having simple but effective means for holding the coupon or other part cut off after it has been severed, the construction being such as to permit the device to be used with equal convenience and certainty of result irrespective of the position of the sheet cut or the location of the part to be severed with respect to said sheet.

With the foregoing and other objects in view, we have devised the novel clipping implement which we will now describe, reference being had to the accompanying drawings, in which:

Fig. 1 is a perspective view of the complete device, illustrating the mode of operation thereof.

Fig. 2 is an enlarged transverse section through the shear blades and the holding members carried thereby.

Fig. 3 is a fragmentary perspective view of the ends of the shear blades, showing a modified form of holding members.

Referring to Figs. 1 and 2, 10 and 11 denote cooperating shear blades pivoted together at 12 and having at their rear ends handle bows 13 by which said blades may be operated in the usual manner. For convenience of description, the blade 10 is herein referred to as the forward blade, being that which, when the device is in use, is disposed toward the coupon 14 or other portion to be severed, the cooperating or rear blade 11 being disposed toward the body of the sheet 15 from which said coupon is cut.

Secured to the blades 10 and 11 respectively are the two members of a pair of holding devices which, in the form of invention shown in Figs. 1 and 2, comprise plates 16 and 17, preferably of resilient metal, secured to said blades by screws 18. The plate 17 is secured to the rear face of the rear blade 11, is bent to extend about the back of said blade, and is extended forwardly beyond the same to provide a gripping portion 20 disposed transverse to the shearing plane of the blades but immediately adjacent said plane. The plate 16 is secured to the forward face of the forward blade 10 and extends slightly beyond the cutting edge of said blade where it is formed with a forwardly projecting flange or gripping portion 19 substantially parallel to the gripping portion 20 of the member 17 and adapted to engage the same when the shears are closed.

The operation of the device will be apparent from Fig. 1 of the drawings. As the blades 10 and 11 are closed upon one another to shear the coupon 14 from the sheet 15, the gripping portions 19 and 20 of the holding members 16 and 17 will also be brought together upon the adjacent marginal portion of said coupon which is thereby firmly held and which may be readily deposited by the operator in any suitable place, using the shears as an implement for that purpose.

The handle bows 13 of the two members of the shears are preferably similar or substantially identical in form, although the blades 10 and 11 are preferably of considerable length, said identical bows making it possible to use the implement either side up with equal facility, and thereby enabling the operator to clip and hold a coupon from a sheet irrespective of the position of the latter or the location of the former with respect thereto.

In the construction shown in Fig. 3, the holding members 21 and 22 are each composed of a looped length of wire having its ends riveted or otherwise secured in openings in the blades 10 and 11, the points of attachment of said members to said blades corresponding substantially to those of the members 16 and 17, and the looped or intermediate portions thereof being bent transverse to the shearing plane to form gripping portions corresponding in position and function to the gripping portions 19 and 20 of the holding members 16 and 17. The loop of the gripping portion of one of the holding members 21 and 22, herein the gripping portion 24 of the member 22, is made of slightly less width than that of the loop of the gripping portion of the other holding member, herein the gripping portion 23 of the member 21, and is so disposed as to project slightly through the same when the shears are closed, thereby insuring a firm holding grip upon the coupon.

Having thus described our invention, we claim:

1. A clipping implement comprising cooperating forward and rear shear blades and a pair of resilient holding members secured respectively to the forward face of the forward blade and to the rear face of the rear blade forwardly of the pivot connecting the blades, said members having forwardly turned cooperating gripping portions disposed transverse to the shearing plane of said blades at the forward side thereof and lying immediately adjacent thereto.

2. A clipping implement comprising a pair of cooperating shear blades and a pair of holding members carried by said blades respectively and each comprising a looped wire having its ends secured to the corresponding blade, one at the forward face of the forward blade and the other at the rear face of the rear blade, the intermediate looped portions of said members being disposed transverse to the shearing plane of said blades immediately adjacent the shearing edges thereof and constituting cooperating gripping portions.

3. A clipping implement comprising a pair of cooperating shear blades and a pair of holding members carried by said blades respectively and having cooperating gripping portions disposed transverse to the shearing plane of said blades, one of said gripping portions being arranged to project through the other when said blades are closed.

4. A clipping implement comprising a pair of cooperating shear blades and a pair of holding members carried by said blades respectively and each comprising a looped wire having its ends secured to the corresponding blades, the intermediate looped portions of said members being disposed transverse to the shearing plane of said blades and constituting cooperating gripping portions, and one of said gripping portions being of less width than the other and projecting therethrough when said blades are closed.

In testimony whereof we affix our signatures.

JOHN J. CONWAY.
EDWARD KOEHLER.